United States Patent [19]

Furuya et al.

[11] 4,355,756
[45] Oct. 26, 1982

[54] CONTAINERS ADAPTED TO CONTAIN FOODSTUFFS

[75] Inventors: Hiroshi Furuya, Kawasaki; Munehisa Okada, Machida; Eiichiro Takemura, Tokorozawa; Hideyo Sato, Yokohama, all of Japan

[73] Assignees: Mitsubishi Kasei Kogyo Kabushiki Kaisha; Zenkoku Nogyo Kyodo Kumiai Rengo Kai, both of Tokyo, Japan

[21] Appl. No.: 198,214

[22] Filed: Oct. 17, 1980

[30] Foreign Application Priority Data

Oct. 25, 1979 [JP] Japan ............................. 54-137984
Nov. 6, 1979 [JP] Japan ............................. 54-143602

[51] Int. Cl.³ .................... B65D 3/12; B65D 3/28
[52] U.S. Cl. .................... 229/4.5; 229/48 SA; 220/80; 428/35; 428/412; 428/464; 428/481; 428/513
[58] Field of Search ............ 229/4.5, 48 R, 3.5 R, 229/48 SA; 220/80; 428/35, 412, 464, 481, 513

[56] References Cited

U.S. PATENT DOCUMENTS

| | | | |
|---|---|---|---|
| 3,146,930 | 9/1964 | Elam | 229/4.5 |
| 3,434,651 | 3/1969 | Ster | 229/5.5 |
| 3,488,252 | 1/1970 | Lamar | 428/513 |
| 3,581,972 | 6/1971 | Buchner | 229/4.5 |
| 3,912,154 | 10/1975 | Godar | 428/35 |
| 3,972,467 | 8/1976 | Willock | 229/3.5 R |
| 4,291,085 | 9/1981 | Ito | 428/35 |

*Primary Examiner*—Herbert F. Ross
*Attorney, Agent, or Firm*—Oblon, Fisher, Spivak, McClelland & Maier

[57] ABSTRACT

In a foodstuff container of the type comprising a cylindrical body of a laminated sheet and lids closing the opposite ends of the cylindrical body, the laminated sheet is made up of two outer layers made of a thermoplastic resin consisting essentially of a synthetic resin having a melting point higher than 115° C., a paper layer and an aluminum foil. The opposite side edges of the laminated sheet are covered by tape shaped aluminum foils with both surfaces coated with a thermoplastic resin similar to that of the laminated sheet, and one ends of both of the tape shaped aluminum foils are bent back to face the inner surface of the container. The tape shaped aluminum foils and the opposite side edges of the laminated sheet are welded together to form the cylindrical body.

6 Claims, 5 Drawing Figures

CONTAINERS ADAPTED TO CONTAIN FOODSTUFFS

BACKGROUND OF THE INVENTION

This invention relates to a container adapted to contain foodstuffs, more particularly a container adapted to contain foodstuffs and enabling retort sterilization thereby greatly increasing the types of the foodstuffs that can be contained or sealed in the container.

Recently a cylindrical container has been developed prepared by suitably laminating sheets of synthetic resin and paper and an aluminum foil, shaping the resulting lamination into a cylinder and then bonding together overlapped side edges of the lamination. Such container is widely used to contain beverages for example, because of its light weight, good appearance, and easiness of printing and disposal by burning.

However, most of these foodstuff containers utilize two outer layers made of a low density polyethylene resin having excellent sealing property, and no device has been made to the joint of both side edges.

A retort sterilization apparatus has also been used because of its relatively imexpensive cost and capability of sterilizing under severe conditions of high temperature and high pressure.

However, when a container having a construction described above is sterilized in a retort at a temperature of 120° C. the low density polyethylene resin film on the surface of the container would melt so that when a large number of the containers are juxtaposed or stacked the outer surfaces of adjacent containers fuse together with the result that when the containers are separated after sterilization the surface films will be peeled off or broken. On the other hand, the inner surface of the container becomes rough and formed with pin holes which not only degrade the appearance but also cause troubles for storing foodstuffs. Moreover, due to the melting of the low density polyethylene resin, the mechanical strength of the joint at the side edges of the container and the joint between the container and its lids decreases greatly so that slight pressure variation on the outside and inside of the container at the time of retort sterilization causes breakage of the joints or container. Where the side edges of a lamination utilized to fabricate the container are merely overlapped and bonded together, water is absorbed through the overlapped side edges, thus causing blur of printed matters on paper layers or separation thereof which decreases the mechanical strength of the paper layer.

For this reason, when sterilizing conventional containers which are sold and stored at normal temperature, the maximum heating temperature is limited to about 90° C. thus limiting the kinds of materials to be contained in the containers.

In order to enrich the kinds of the contents to increase the sterilizing temperature and time, general index thereof should be a $F_o$ value of higher than 4.

The $F_o$ value represents the heating time necessary to kill bacilli or spores of a definite concentration at a predetermined temperature, usually in terms of minutes to kill at 250° F. (121° C.). Other temperatures are expressed by converting them into 250° F. For example botulism bacilus (clostridium botulium) is said to be killed in a phosphoric acid solution when heated for 4 minutes at 250° F. which conditions are expressed as $F_o = 4$.

SUMMARY OF THE INVENTION

Accordingly, it is an object of this invention to provide a container especially suitable for containing a variety of foodstuffs and can be sterilized with a retort.

Another object of this invention is to provide an improved foodstuff container that can protect foodstuffs contained therein even when the surface layers of the container are scratched or damaged during transportation.

According to this invention there is provided a foodstuff container of the type comprising a cylindrical body and lids closing opposite ends of the cylindrical body and wherein the cylindrical body is made of a laminated sheet of a synthetic resin layer, a paper layer and an aluminum foil, characterized in that the laminated sheet is made up of two outer layers made of a thermoplastic resin consisting essentially of a synthetic resin having a melting point higher than 115° C., a paper layer and an aluminum foil, that each lid is made up of an aluminum foil coated with a thermoplastic resin similar to that of the laminated sheet, that opposite side edges of the laminated sheet are covered by separate tape shaped aluminum foils with both surfaces coated with a thermoplastic resin similar to that of the laminated sheet, that one end of both the tape shaped aluminum foil is bent back to face the inner surface of the container, and that the tape shaped aluminum foils and the opposite side edges of the laminated sheet are welded together such that said aluminum foils are disposed in a non-superimposed contiguous relation so as to form the cylindrical body.

DESCRIPTION OF THE PREFERRED EMBODIMENTS

Figure 1:
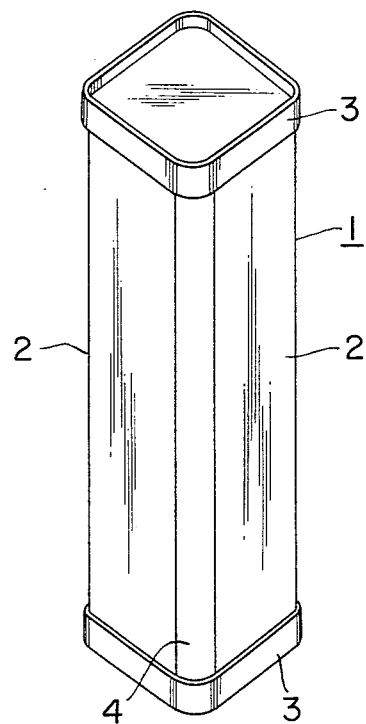
FIG. 1 is a perspective view showing one example of a container embodying the invention.

As shown in FIG. 1, a foodstuff container embodying the invention comprises a cylindrical body 1 (in this example having a square sectional configuration) and upper and lower lids 3. The body portion 1 is prepared by bending a laminated sheet 2 made up of synthetic resin layers, a sheet of paper and aluminum foil (the detail will be described later) and then welding or fusing together overlapped side edges of the sheet 2.

Both outer layers of the laminated sheet 2 are made of a resin consisting essentially of a thermoplastic resin having a melting point higher than 115° C. Among the thermoplastic resins having a melting point higher than 115° C. are included high and medium density polyethylene resins, polypropylenes, polyethylene terephtharate, polybutylene terephtharate and polycarbonate. Of these, high density polyethylene, polypropylene and polyethylene phtharate resins are preferred. The high density polyethylene resin generally has a density higher than 0.941. So long as the high density polyethylene comprises the major portion, the thermoplastic resin may contain other resins.

However, where only the high density polyethylene resin is used, as will be described later, and when the laminated sheet 2 is prepared by extrusion certain disadvantages are inevitable so that it is advantageous to incorporate other type of resin.

Workabilities required for extrusion lamination methods are excellent thin sheet formability (an ability of forming thin resin sheets, that is an ability of forming thinner sheets as the working speed is increased) and a small neck-in phenomenon (a phenomenon in which when extruding a film through a T die the width of the extruded film becomes smaller than the effective width of the die and the thickness on both sides of the film is increased).

Pure high density polyethylene resin can not satisfy all of these requirements but it was found that when a suitable quantity of low density polyethylene resin having a high flowability is blended with the high density polyethylene resin the defects thereof can be eliminated.

The amount of blending of the low density polyethylene resin is from 10 to 25% by weight based on the weight of the high density polyethylene resin. Thus, the major portion of the mixture comprises the high density polyethylene resin.

When the amount of the lower density polyethylene resin is lesser than that just mentioned the effect of blending does not appear, whereas too much amount of the low density polyethylene greatly decreases heat resistant property.

When sterilizing in a retort under a temperature condition of 120° C., the upper limit of the blended low density polyethylene resin is 25% by weight as has been pointed out hereinabove. The term low density polyethylene resin used herein means a polyethylene resin having a density of lower than 0.925.

One example of the construction of the laminated sheet 2 comprises a thermoplastic synthetic resin layer consisting essentially of a high density polyethylene layer, a paper layer, a binder layer, an aluminum foil, a binder layer and a thermoplastic synthetic resin layer consisting essentially of a high density polyethylene resin which are arranged in the order mentioned starting from the outer side of the container. However, it should be understood that the invention is not limited to this construction and that many other constructions may be used. For example the positions of the aluminum foil and the paper layer must be exchanged or a much more number of laminated layers may be used.

The binder is used for the purpose of firmly bonding together adjacent sheets of the laminated sheets. For this reason, it is advantageous to use a low density polyethylene resin as the binder.

The paper layer comprises a relatively thick paper sheet prepared by a paper making machine by using chemically treated wood pulp, crushed wood pulp, straw pulp and once used paper, or mixtures thereof as raw materials.

Since such papers are hard and have a substantial stiffness, they are widely used as wrapping papers, papers for preparing cardboards, yellow paper boards and white paper boards. Especially, white paper sheets are preferred. The weight or density of the paper sheet usually ranges from about 180 to 400 g/m$^2$.

The aluminum foil may be a conventional one used for packing and has a thickness of about 5–150$\mu$. For use as the main body of the container a preferred thickness of the aluminum foil is about 70–80$\mu$ and as the lids about 150$\mu$. The laminated sheet 2 made up of aforementioned materials is prepared with a suitable method, for example an extrusion lamination method.

To prepare the foodstuff container of this invention the laminated sheet 2 is rounded or shaped into a square cylindrical form and then the opposite side edges of the sheet are fused together. The opposite surfaces of each aluminum foil 4 are coated with a synthetic resin of the same type as the thermoplastic resin consisting essentially of high density polyethylene resin and used to prepare the laminated sheet 2.

The aluminum foils 4 are applied to both side edges to surround the same across the entire width of the laminated sheet 2. One side of at least one tape shaped aluminum foil 4 is bent back to face one side of the laminated sheet 2, that is the inner surface of the container.

Figure 2:
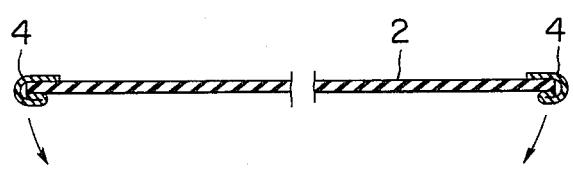
FIG. 2 is a sectional view showing a laminated sheet utilized to fabricate the container shown in FIG. 1.

FIG. 2 shows a transverse sectional view of the laminated sheet 2 with tape shaped aluminum foils 4 attached to the opposite side edges. As shown, only one side of each aluminum foil 4 facing the inner surface of the sheet is bent back. Where the bent back portions of both aluminum foils do not face the same inner surface of the laminated sheet 2, that is where one bent back portion faces the upper surface of the sheet 2 while the other faces the lower surface, not bent back end of the aluminum foil would come into contact with the foodstuff contained in the container when the side edges of the laminated sheet 2 are fused together, thereby contaminating the foodstuff.

It will be clear that the manner of using the aluminum foils 4 is not limited to that shown in FIG. 2 and that any shape may be used so long as one end of at least one aluminum foil 4 is bent back to face the inner surface of the laminated sheet 2.

Figure 3:
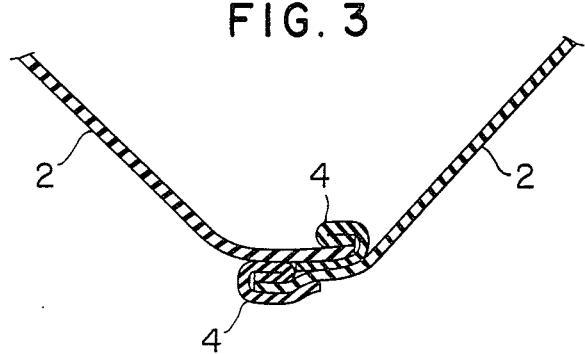
FIG. 3 is an enlarged partial sectional view of a joint of the container.

The laminated sheet 2 attached with aluminum foils 4 at both ends is bent in directions shown by arrows in FIG. 2 so as to cause the bent back portions of the aluminum foils 4 to face the inner surface of a resulting container. Then the overlapped side edges are welded together to form a cylindrical body.

Where both aluminum foils are bent back, as shown in FIG. 3, instead of superposing the aluminum foils they are disposed in a contiguous relation.

Where both aluminum foils are bent back and where the bent back portions are superposed and then welded together, the thickness of the joint of the container increases which is not practical.

In any event, the side edges of the laminated sheet 2 on the inside of the joint are completely shielded by the bent back portion thus preventing the side edges from absorbing moisture. Furthermore, the bent back portions prevent the aluminum foils from contacting the content thus preventing contamination of the content caused by aluminum.

The upper and lower openings of the cylindrical body are closed by welding thereto lids 3 made of aluminum foils with their inner sides coated with a synthetic resin similar to that used for the laminated sheet.

After pouring a foodstuff, for example liquid beverage, into the container, it is sterilized with a conventional retort.

As above described the invention provides a novel container which not only preserves advantages resulting from the use of a laminated sheet comprising polyolefin resin layers, a paper layer and an aluminum layer but also enables retort sterilization thus increasing the kinds of foodstuffs that can be contained in the container.

To have better understanding of the invention some examples are given as follows but not for limiting the scope of the invention.

EXAMPLE 1

The laminated sheet for preparing the cylindrical body, the tape shaped aluminum foil used to bond together the side edges of the laminated sheet and the lids were prepared by extrusion lamination technique to have the following dimensions.

| Laminated sheet | |
|---|---|
| Width of the laminated sheet | 240 mm |
| Thickness of the outer polyethylene resin layer* | 45μ |
| Density of the paper sheet | 270 g/m² |
| Thickness of the binder layer LDPE** | 20μ |
| Thickness of the aluminum foil | 12μ |
| Thickness of the binder layer LDPE** | 20μ |
| Thickness of the inner polyethylene resin* | 65μ |
| These layers were laminated in the order mentioned. | |
| Aluminum foil | |
| Width of the tape shaped aluminum foil | 20 mm |
| Thickness of the outer polyethylene layer* | 50μ |
| Thickness of the aluminum foil | 25μ |
| Thickness of the inner polyethylene layer* | 50μ |
| Lid | |
| Thickness of the inner polyethylene layer* | 50μ |
| Thickness of the binder layer LDPE** | 30μ |
| Thickness of the aluminum foil | 130μ |

Remark
*a blend of 80% by weight of a high density polyethylene resin (for example NOVATEC-registered trade mark of the assignee) 40, M.I. = 5.0, $p$ = 0.968, and 20% by weight of a low density polyethylene resin (NOVATEC LL-300, M.I. = 3.5, $p$ = 0.922).
**a low density polyethylene resin (for example, NOVATEC-LL300, M.I. = 3.5, $p$ = 0.922).

With a HYPA system apparatus (manufactured by F.L. Hessel Machinen Fabrik A.G.) a container with upper and lower lids as shown in FIG. 1 was manufactured and 700 ml of water was filled in the container instead of a foodstuff. The joint of the resulting cylindrical body has a construction shown in FIG. 3, and the width of the not bent back end of the aluminum foil (width, 20 mm) was about 8 mm.

On the assumption that the content was a liquid foodstuff, the container was sterilized under the following conditions by using ROTORZWERG hot water rotary retort (manufactured by Stock Co., West Germany).

RETORT STERILIZING CONDITIONS

The temperature was increased from an initial value of 80° C. to 120° C. for 30 seconds and maintained at 120° C. for 20 minutes. The container was rotated at a speed of 8 r.p.m. under a preset pressure of 2 kg/cm² (gauge pressure) and cooled for 11 minutes under this pressure. After sterilization it was found that there was no rupture and deformation of the container and that absorption of water from the jointed edges of the cylindrical body and formation of pin holes were also not noted. Blurring of printed ink was also not noted.

The weight of the conatiner was increased by 0.6 g after sterilization. It was thought that this was caused by moisture absorption of the resinous outer layers. The $F_o$ value at the time of sterilization was 8.9.

CONTROL EXAMPLE 1

The cylindrical body of the container was identical to that of Example 1 except that tape shaped aluminum foils were not applied to the joint. After filling water in the container it was sterilized under the same conditions as in Example 1. After sterilization, the shape of the container was not changed but the paper absorbed water through the ends at the joint thus causing blurring of ink throughout the container. The weight of the container was increased by 13 g after sterilization which should be compared with 0.6 g of Example 1.

EXAMPLE 2

In this example, the container was manufactured just in the same manner as that of Example 1, and sterilized in a retort under the following conditions.

RETORT STERILIZING CONDITIONS

The temperature was increased from an initial value of 23° C. to 120° C. for 1 minute and 30 seconds and this temperature was maintained for 20 minutes. The container was rotated in the retort at a speed of 8 r.p.m. under a set pressure of 2 kg/cm² (gauge pressure) and then cooled for 11 minutes under this pressure. Similar to Example 1, after the sterilization the container showed no change in shape and appearance.

The weight of the container was increased by 0.4 g after sterilization and the $F_o$ value at the time of sterilization was 7.2.

CONTROL EXAMPLE 2

The container used in this control example was identical to that used in Example 2 except that tape shaped aluminum foils were not applied to the joint of the cylindrical body. After filling water into the container, it was sterilized in the same manner as in Example 2. After the sterilization, the appearance and shape of the container were normal but printed ink was blurred throughout the container due to water absorbed through the ends of the laminated sheet at the joint.

The weight of the container after sterilization was increased by 13.7 g.

EXAMPLE 3

A container was manufactured just in the same manner as in Example 1 and the container was sterilized in a retort under the following conditions.

RETORT STERILIZING CONDITIONS

The temperature was increased to 125° C. from an initial value of 80° C. for 30 seconds and this temperature of 125° C. was maintained for 20 minutes.

The container was rotated in the retort at a speed of 8 r.p.m. under a set pressure of 2.5 kg/cm² (gauge pressure) and then cooled for 12 minutes under this pressure. As in the case of Example 1, no change of the container was noted after sterilization. The weight of the container was increased by 0.4 g after sterilization and the $F_o$ value at the time of sterilization was 27.4.

CONTROL EXAMPLE 3

The container was identical to that used in Example 3 except aluminum foils were not applied to the joint of the cylindrical body. After filling the container with water it was sterilized in the same manner as in Example 3. Although the appearance of the container after sterilizaton was normal, water was absorbed through the ends of the paper sheet thus causing blurring of the printed ink throughout the container.

The weight of the container after sterilization was increased by 14 g. Although the containers described above have many advantages, when they are conveyed into and out of a sterilization retort, not only the outer layers made of thermoplastic resins but also underlying paper layer are often scratched with the result that hot water enters into the containers which is absorbed by paper sheet thus decreasing the strength of the paper sheet which in turn causes deformation and crimples.

To avoid these difficulties when the laminated sheet is constituted by an outer aluminum layer and an inner paper layer although the problem of scratches can be eliminated, the quality and taste of the foodstuff are degraded by the smell of the paper.

Figure 4:
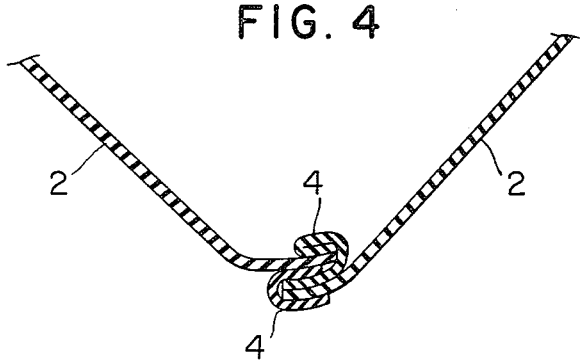
FIG. 4 is a view similar to FIG. 3 but showing modified joint.

In a modified laminated sheet 2' shown in FIG. 2, aluminum foil layers $2_c$ are interposed between two outer layers $2_a$ made of a thermoplastic resin consisting essentially of high density polyethylene resin and a center paper layer $2_b$. In this modified laminated sheet 2' too, the composition of the outer layers and the characteristics (density, thickness, raw materials, etc.) of the aluminum foil and the paper layer are the same as those described above and the side edges of the laminated sheet 2' are bonded together as shown in FIG. 3 and FIG. 4 by using tape shaped aluminum foils 4.

With this improved construction even when the outer resin layers $2_a$ are scratched by conveying means, aluminum foils $2_c$ prevent water from reaching the center paper layer thus preventing blurring of printed ink and deformation of the container. Moreover, the aluminum foils on the opposite sides of the paper layer prevent contamination of the foodstuff caused by the smell of the paper layer.

EXAMPLE 4

Figure 5:
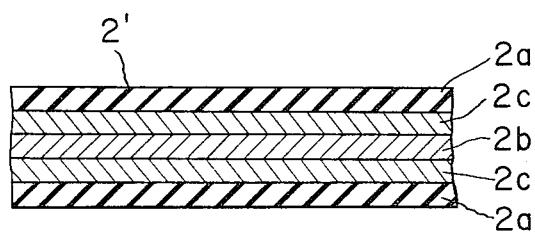
FIG. 5 is a longitudinal sectional view of a modified laminated sheet.

The laminated layer 2', the aluminum foils 4 and the lids 3 were manufactured by extrusion lamination technique by using the same or similar materials as in Example 1 except the following. Thus, in this example the laminated sheet 2' had a construction as shown in FIG. 5, and each of the aluminum foils $2_c$ had a thickness of $12\mu$ and its both surfaces were treated with an ordinary anchor coating of the urethane type, and only one surface of the aluminum foil 4 contacting the resin layer was treated with anchor coating of the urethane type.

The container of this example was filled with 700 ml of coffee beverage and sterilized with a hot water rotary type retort (Trade name ROTORZWERG, manufactured by Stock Co., West Germany) under the following conditions. Thus, the temperature was increased to 120° C. from an initial value of 15° C. for 2 minutes and the temperature of 120° C. was maintained for 18.5 minutes, under a preset pressure of 2 kg/cm² (gauge pressure) and then cooled for 8 minutes under this pressure. The container was rotated in the retort at a speed of 8 r.p.m.

No rupture or deformation of the container was noted after sterilization and water was not absorbed through the jointed ends of the laminated sheet. No pin hole was formed. The weight of the container was increased by 0.3 g after sterilization which can be attributed to moisture absorption of the outer resinous layers. The $F_o$ value at the time of sterilization was 4.7.

CONTROL EXAMPLE 4

Similar container as that of Example 4 was prepared except that the aluminum foils were not applied at the joint and sterilized with the same retort as that used in Example 4.

Although the container was not broken, the strength of the paper sheet was extremely lowered due to water absorbed through the ends of the laminated sheet, thus causing crimples and deformation. The weight of the container was increased by 13.3 g after sterilization.

EXAMPLE 5

The container identical to that of Example 4 was prepared, filled with water and sterilized in the same manner as in Example 4. After sterilization the weight of the container was increased 0.2 g and no deformation or crimple was noted.

The $F_o$ value at the time of sterilization was 23.

CONTROL EXAMPLE 5

A container similar to that of Example 5 was prepared except that aluminum foils 4 were not applied to the joint. After filling water, the container was sterilized under the same conditions as in Example 5 and similar defects were noted due to water absorption. The weight of the container was increased by 13.7 g after sterilization.

Other examples and control examples showed similar results.

We claim:

1. A foodstuff container comprising a cylindrical body and lids closing opposite ends of said cylindrical body, said cylindrical body being formed with a laminated sheet made up of two outer layers made of a thermoplastic resin consisting essentially of a synthetic resin having a melting point of higher than 115° C., a paper layer and an aluminum foil, each lid being made up of an aluminum foil coated with a thermoplastic resin similar to that of said laminated sheet, opposite side edges of said laminated sheet being covered by separate tape shaped aluminum foils with both surfaces coated with a thermoplastic resin similar to that of said laminated sheet, one side of each said tape shaped aluminum foils being bent back upon itself so that its outer surface is in face to face contact with the inner surface of said container, said tape shaped aluminum foils and said opposite side edges of said laminated sheet being welded together such that said aluminum foils are disposed in a non-superimposed contiguous relation so that the unbent side of one tape faces the fold or bent portion of the other tape, thereby avoiding impractical thickness of the weld to form said cylindrical body.

2. The foodstuff container according to claim 1 wherein said thermoplastic synthetic resin having a melting point of higher than 115° C. is selected from the group consisting of high density and medium density polyethylene resins, polypropylene, polyethylene terephtharate, polybuthylene terephtharate and polycarbonate.

3. The foodstuff container according to claim 1 wherein said thermoplastic resin comprises a mixture of 75–90% by weight of a high density polyethylene resin and 10–25% by weight of a low density polyethylene resin.

4. The foodstuff container according to claim 1 wherein said laminated sheet comprises two outer layers of said thermoplastic resin, a paper sheet and an aluminum foil which are bonded together in the order mentioned.

5. The foodstuff container according to claim 1 wherein said laminated sheet comprises two outer layers of said thermoplastic resin, a central paper layer, and aluminum foils respectively interposed between said outer layers and said paper layer, said layers and foils being bonded together.

6. The foodstuff container according to claim 1 wherein said paper layer has a density of about 180–400 g/m$^2$.

* * * * *